Aug. 7, 1934.  A. G. MARANVILLE  1,969,088
VEHICLE TIRE
Filed Aug. 15, 1932   10 Sheets-Sheet 2

INVENTOR
*Alger G. Maranville*
BY *Evans & McCoy*
ATTORNEYS

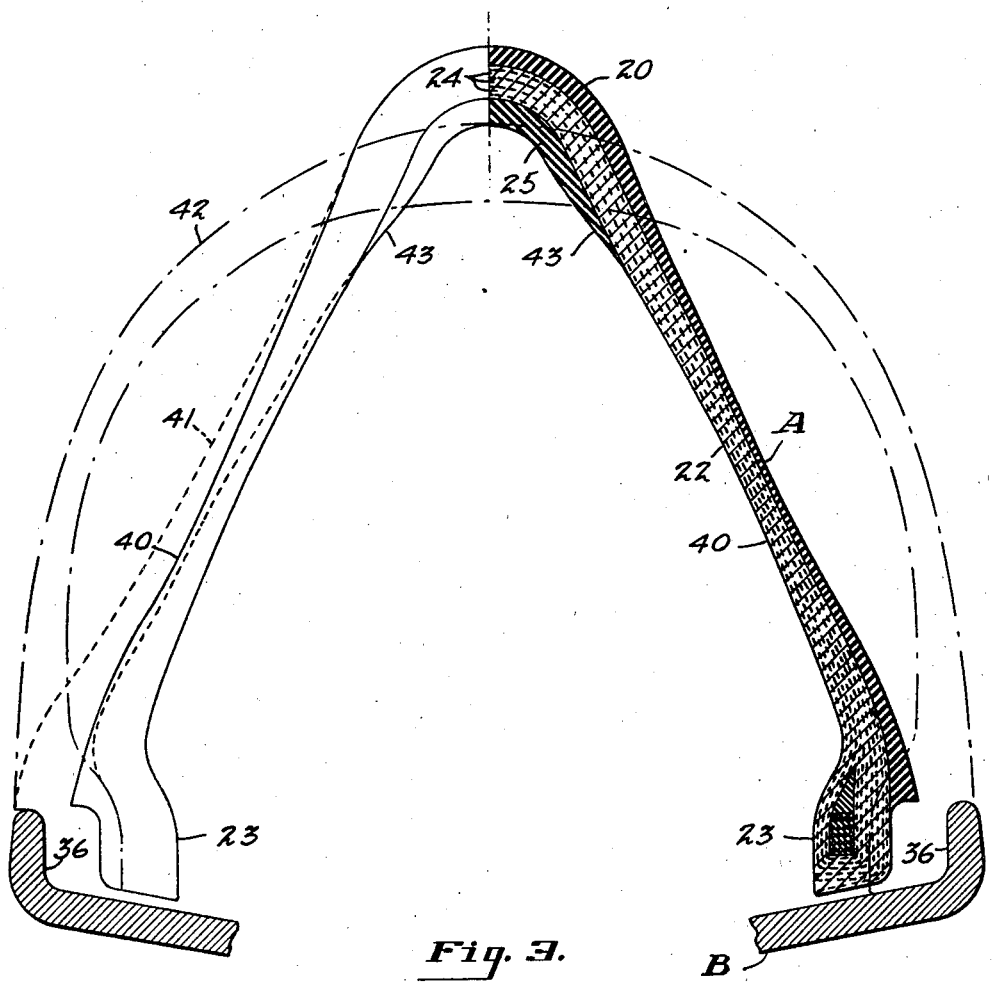

Aug. 7, 1934.  A. G. MARANVILLE  1,969,088
VEHICLE TIRE
Filed Aug. 15, 1932   10 Sheets-Sheet 4

INVENTOR
Alger G. Maranville
BY Evans & McCoy.
ATTORNEYS

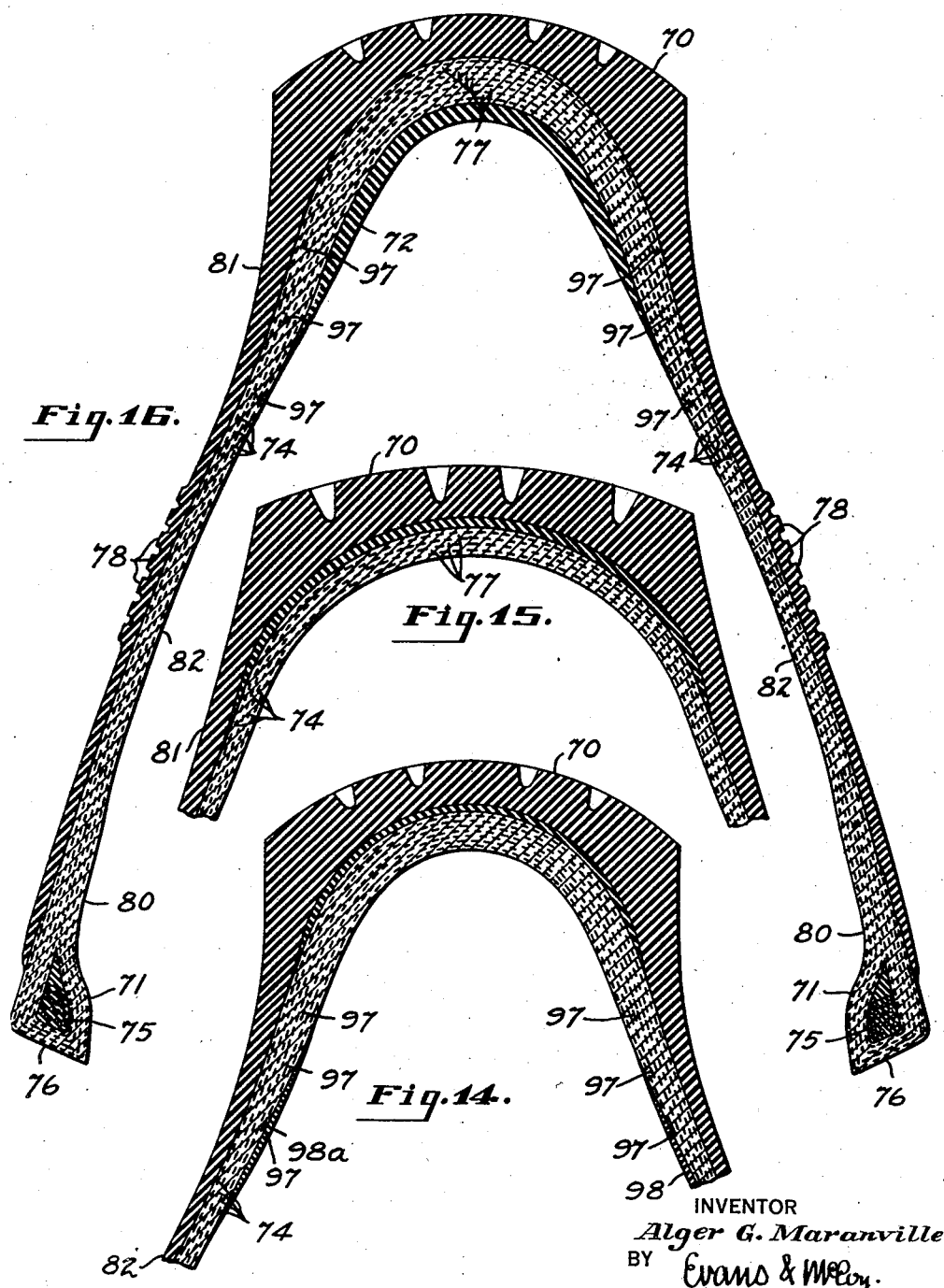

Patented Aug. 7, 1934

1,969,088

UNITED STATES PATENT OFFICE 1,969,088

VEHICLE TIRE

Alger G. Maranville, Cuyahoga Falls, Ohio, assignor to The General Tire & Rubber Company, Akron, Ohio, a corporation of Ohio Application August 15, 1932, Serial No. 628,869

7 Claims. (Cl. 152—13)

This invention relates to pneumatic tire casings for aircraft landing wheels, motor vehicles and the like, and has for its object to provide a pneumatic tire for aircraft, automobiles and other vehicles embodying certain novel features of construction which so improve the load sustaining, shock absorbing and other operating characteristics of the tire that a very low inflation pressure may be employed without impairing the durability of the tire. Pneumatic tires embodying the invention have improved stability, free rolling, and easy steering action at unusually low inflation pressures, they more effectively absorb shocks, are easy riding, and more resistant to puncture than conventional tires, and, when used on automobiles, the improved tires do not put a drag on the steering gear and do not have a speed retarding effect greater than that of conventional tires at their recommended higher inflation pressures.

The critical factor determining the life of cord reinforced pneumatic tire casings is the sustained capability of the reinforcing cords in the tire casing to resist without rupture the stresses to which they are subjected in service. These cords resist stretching of the casing walls and are continuously subjected to a tension which is substantially proportional to the inflation pressure. The cords must have sufficient strength to withstand the tension to which they are subjected upon distortion of the casing under normal loads and also under the excessive loads imposed thereon by impacts, and, if the tire is to have long life, the cords must be protected against deterioration. The deterioration or fatigue of the reinforcing cords of a tire is caused by repeated bending thereof while under tension due to the flattening of the portion of the tire engaging the road, and the rapidity of deterioration increases greatly with the amount and degree of flexing so imposed upon the cords.

As inflation pressures increase, tension on the cords, due to the internal pressure, increases, but the degree of flexing of the casing walls due to imposed loads and impact shocks decreases. Decreasing the air pressure results in decreased cord tension and an increase in the cushioning action of the tire, but it also increases the amount and degree of flexing of the side walls during normal operation. Therefore, unless the inflation pressure in conventional balloon tires is maintained at or above a minimum pressure, the life of the tire is greatly shortened by fatigue of the fabric due to the excessive flexing of the side walls during each revolution of the wheel and also due to bruises caused by collapse of the casing against the rim under impacts. The higher pressures used in conventional balloon tires also causes permanent elongation of the cords which is disadvantageous.

It is well known that if the air capacity designed for a given load is increased, the inflation pressure may be reduced, this being the theory underlying the construction of conventional balloon tires. However, balloon tires as heretofore constructed cannot be operated at pressures as low as desirable for easy riding without rim bumping, instability, and excessive flexing which greatly shortens the life of the tire, renders steering difficult and produces "rolling" and "shimmy" at higher speeds.

As a portion of a pneumatic tire engages the ground it deflects under load, a portion of the load is maintained by the enclosed body of air under pressure and a portion is imposed upon the material of the tire casing. As the load increases, the proportion of the load imposed on the material of the tire casing increases and, at low inflation pressures, a greater proportion of the load is at all times imposed on the casing. Balloon tire casings of conventional design, if used at the low inflation pressures recommended for tire casings embodying this invention, are deficient in that they are not capable of sustaining a sufficient proportion of the load at such low inflation pressures to enable the tire to cushion the heavier of the impact shocks to which the tire is subjected in ordinary service, and in addition, the side walls of the tire are continuously subjected to excessive flexing which causes them to deteriorate rapidly. The tires are also sluggish in operation and lack the necessary stability and cushioning capacity for proper road performance.

Tires of conventional design, unless inflated to a high pressure, are not capable of effectively resisting thrusts tending to shift the wheels laterally with respect to the treads of the tires in engagement with the ground, with the result that in traveling over rough roads lateral vibration, known as shimmying and rolling, may be set up in the vehicle, which makes riding uncomfortable and steering of the vehicle difficult and unsafe.

The present invention involves an improvement in the design and construction of pneumatic tire casings wherein side wall flexure under a given load at a low inflation pressure is greatly reduced; the stresses set up in the portion of the body of the tire immediately adjacent the ground are advantageously distributed so that the individual cords are protected against excessive tension and excessive flexing particularly in the shoulder portions of the tires; whereby, when the tires are inflated at very low pressures, severe impact shocks are largely absorbed by the tires so as to provide easy riding over rough roads with greatly improved stability; and whereby the tires are not injured by operation at low inflation pressures.

In tire casings embodying this invention the tension on the cords due to inflation pressure is greatly reduced by reason of the fact that the inflation pressure is low and the internal area of the laterally flexible portion of the casing is considerably less than in tires of conventional design and of corresponding volumetric capacity.

An important object of the present invention is to provide a tire casing of a form such that it provides a stable support for a wheel even at very low inflation pressures and which effectually resists lateral movements of the wheel with respect to the tire so that proper traction is maintained, lateral sway is minimized and easy steering of vehicles is obtained even on rough roads and at high speeds.

A further object of the invention is to provide a tire which has superior shock absorbing qualities due to the fact that a large percentage of impact pressures are absorbed by the tread portion of the tire casing and which has considerably less rebound than tires of conventional design in which a larger proportion of the load is imposed on the air within the tire.

A further object of the invention is to provide a tire casing which is so constructed that it has a greater range of radial deflection than a tire of conventional design of the same volumetric capacity, so that the tire can effectively absorb the shocks due to passage over relatively high bumps or ridges on a road surface without bruising the tire carcass by impact against the rim or sharp bending over the obstruction.

A further object of the invention is to provide a motor vehicle tire which has considerably greater radial depth than a tire of conventional design of the same rated load carrying capacity, and which also has considerably greater width at its base than a corresponding tire of conventional design whereby a deeper cushion and a more stable wheel is provided.

A further object of the invention is to provide a tire which not only has a wide range of radial deflection but which also has a tread narrower than the rim or wheel member on which the tire is mounted so that the relatively stiff inner portions of the side walls of the tire adjacent the bead are disposed to receive the impacts at the tread portion of the tire and cushion the impact when the tire is flattened against the rim, whereby heavy impact shocks are more effectively absorbed, bruising of the tire walls is greatly reduced, and the tire casing is more resistant to puncture.

A further object is to provide a tire having a tread in which the stresses due to inflation are so balanced as to increase the elasticity and flexibility of the tread and shoulder portions of the tire to permit these portions of the tire to stretch and bend re-entrantly in passing over irregularities on a road surface without imposing excessive tension on the cords and at all times to maintain an effective frictional engagement with the road surface, whereby uniform tread wear is obtained and whereby the tire will conform more closely to irregularities on a road surface in passing over them and less damage is done to the fabric reinforcement in passing over sharp irregularities.

A further object of the invention is to provide a pneumatic tire casing which when uninflated and mounted on a wheel member has substantially straight side walls tapering from a wide base to a narrower tread, and which when inflated is of more rotundate form in cross section but which is prevented by the large diameter tread from assuming the rotundate form toward which it is urged by the internal air pressure, the tread being placed under circumferential compression and reduced in diameter by the inflation pressure but having sufficient rigidity to hold the inflated tire to ovate cross-sectional form.

In pneumatic tires of conventional design which are molded internally round in transverse section, all of the internal air pressure tends to stretch the tire casing, which tendency is resisted by the reinforcing cords and by the elasticity of the rubber. During the life of the tire the constant tension gradually lengthens the cords and the rubber gradually loses its elasticity with the result that with age the tire grows to greater size.

It is one of the objects of the present invention to reduce the growth of tires with age and this object is accomplished by reducing the stretching effect of the compressed air within the tire by employing lower inflation pressures, by providing a tire of a shape and character such that a smaller proportion of the expansive pressure is applied to the casing walls and by vulcanizing the tire to a form such that a large part of the outward thrust of air within the tire is so expended on the casing as to put the rubber of the tread portion of the tire under compression, crowding the cords in the outer portion of the tire casing closer together and compressing the rubber between the cords so that the tread provides an elastic medium serving to distribute impact shocks throughout a considerable portion of the tire casing and thereby limit the tension to which the individual cords are subjected in service.

A further object of the invention is to provide a tire casing which is so constructed that the inner portions of the side walls of the tire casing are held in a nearly vertical position as the tread is deflected under load, whereby the transverse rigidity of the casing is maintained as the tread is deflected under load and whereby, under conditions of extreme deflection, the tread portion is caused to move down between the nearly vertical side walls and into engagement therewith adjacent the beads, so that the relatively rigid bead portions and the tread of the tire casing form a cushioning arch which takes the impact of unusual shocks sufficient to fully collapse the tire.

The stability, yieldability, and the shock absorbing and clinging to the road characteristics of the tire of the present invention greatly lessen the danger in driving at high speeds around sharp curves and over rough roads, and greatly reduces side slip and forward sliding of wheels locked by the vehicle brakes.

With the above and other objects in view the invention may be said to comprise a tire casing and method of manufacture as illustrated in the accompanying drawings hereinafter described and particularly set forth in the appended claims, together with the variations and modifications thereof which will be apparent to one skilled in the art to which the invention appertains.

Reference should be had to the accompanying drawings forming a part of this specification, in which.

Figure 1:
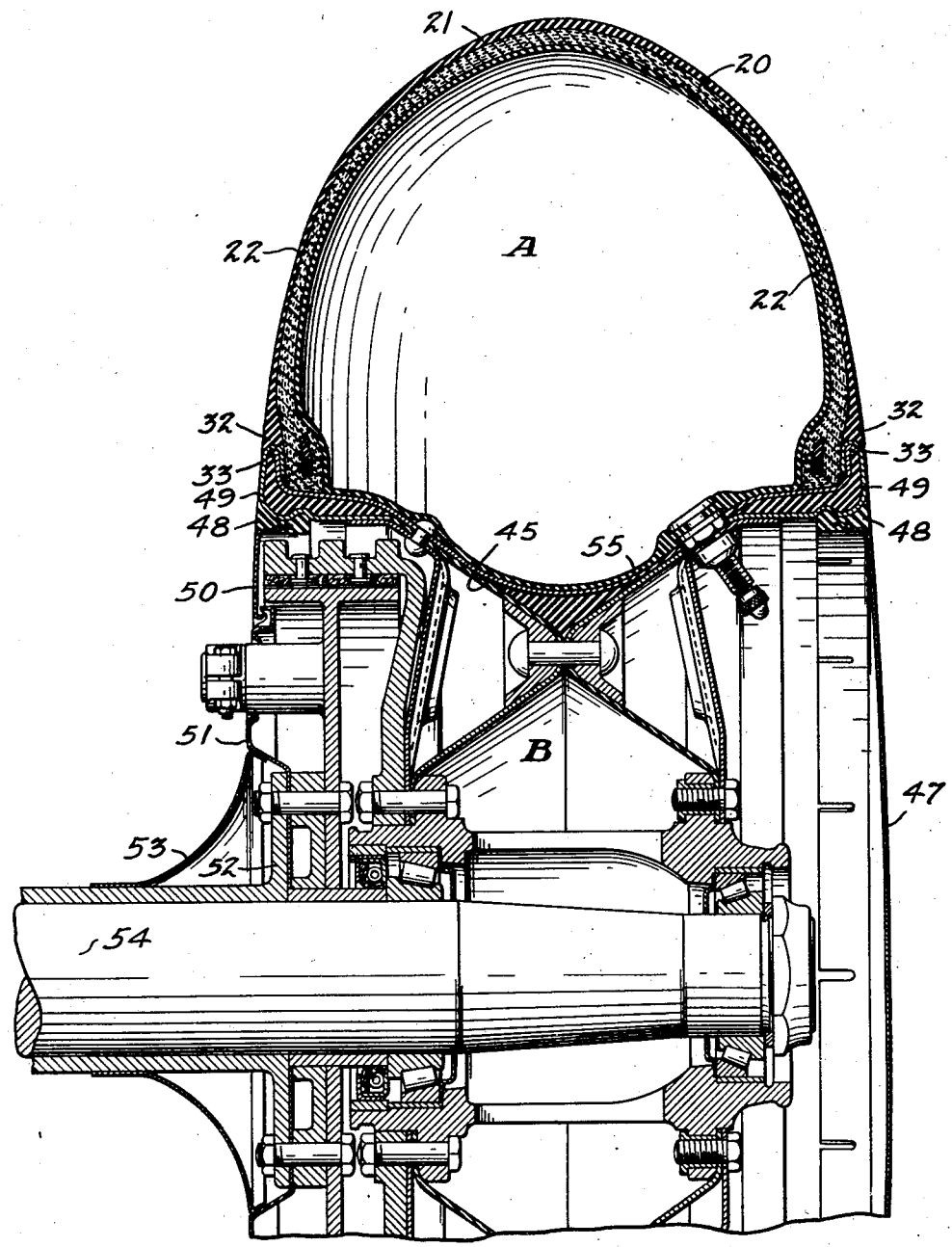
Figure 1 is a transverse section through a tire suitable for airplane use showing the same mounted on one type of hub member that may be used in connection therewith.
Figures 4, 5:
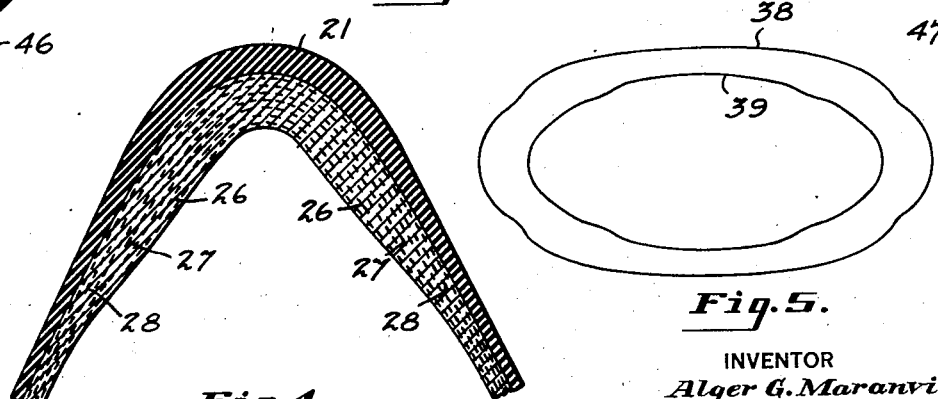
Figure 6:
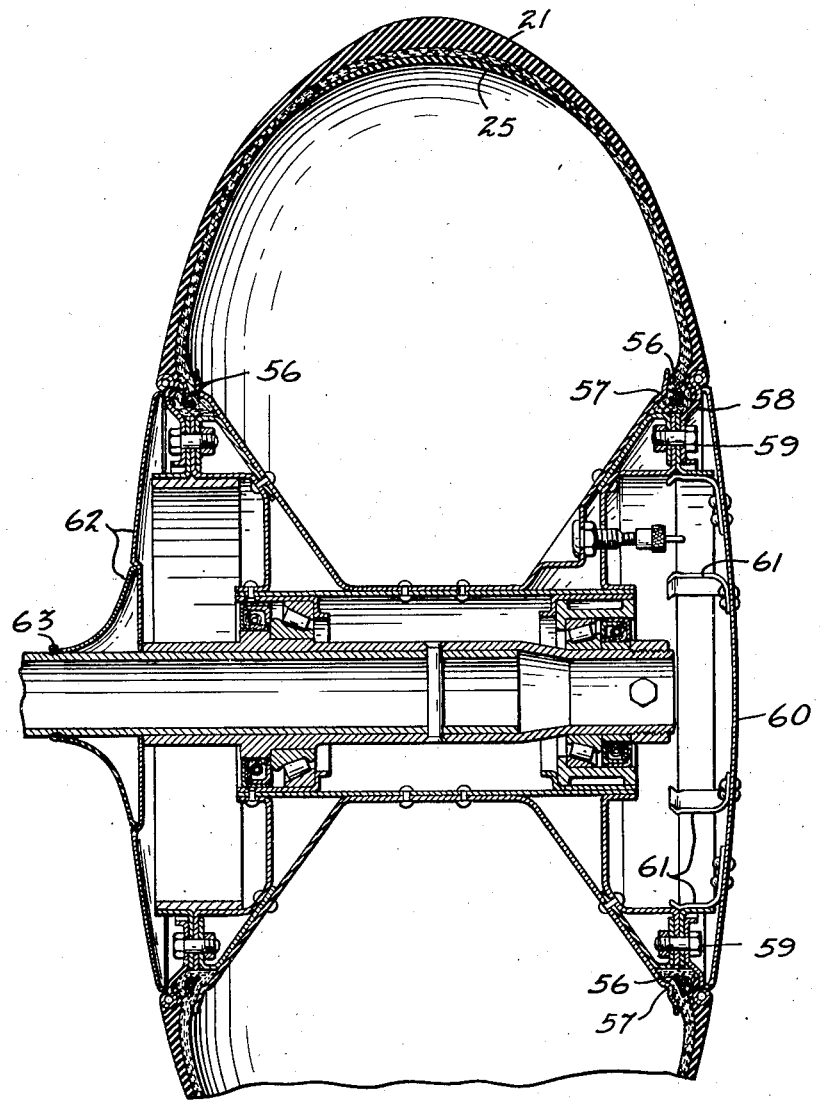
Figure 7:
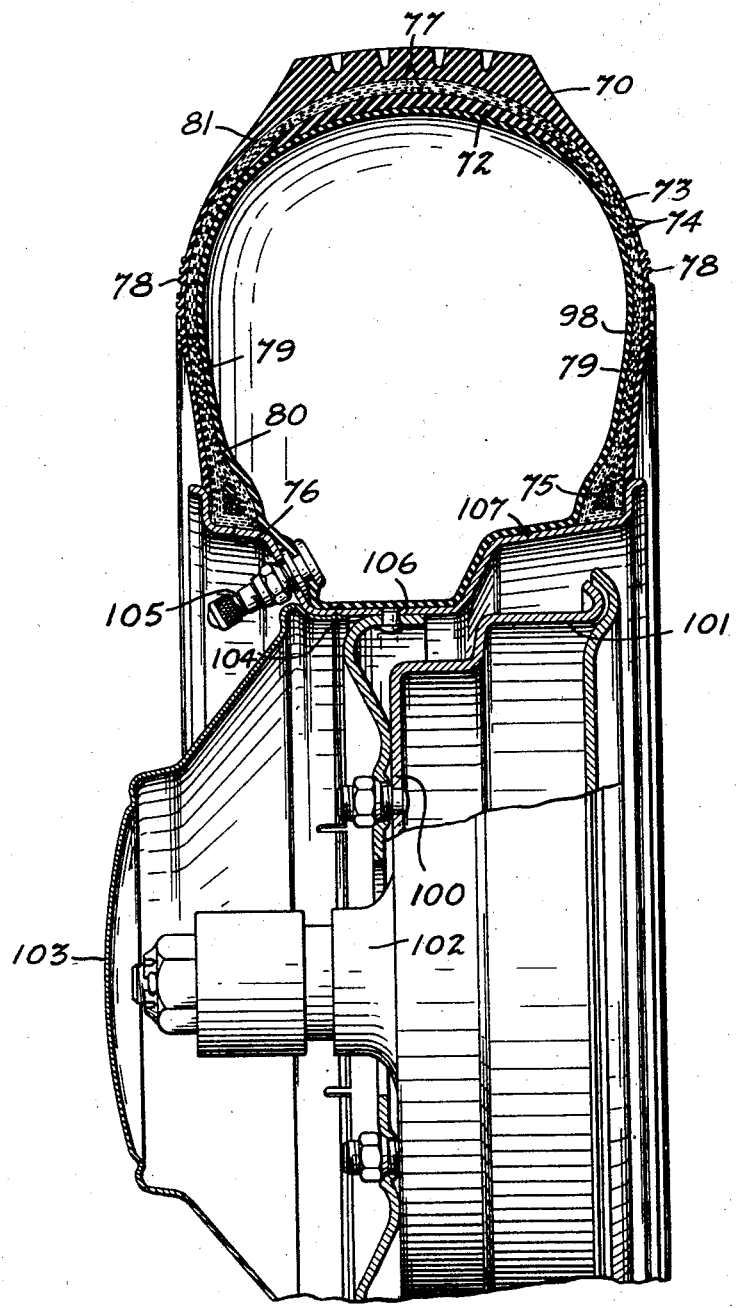
Figure 8:
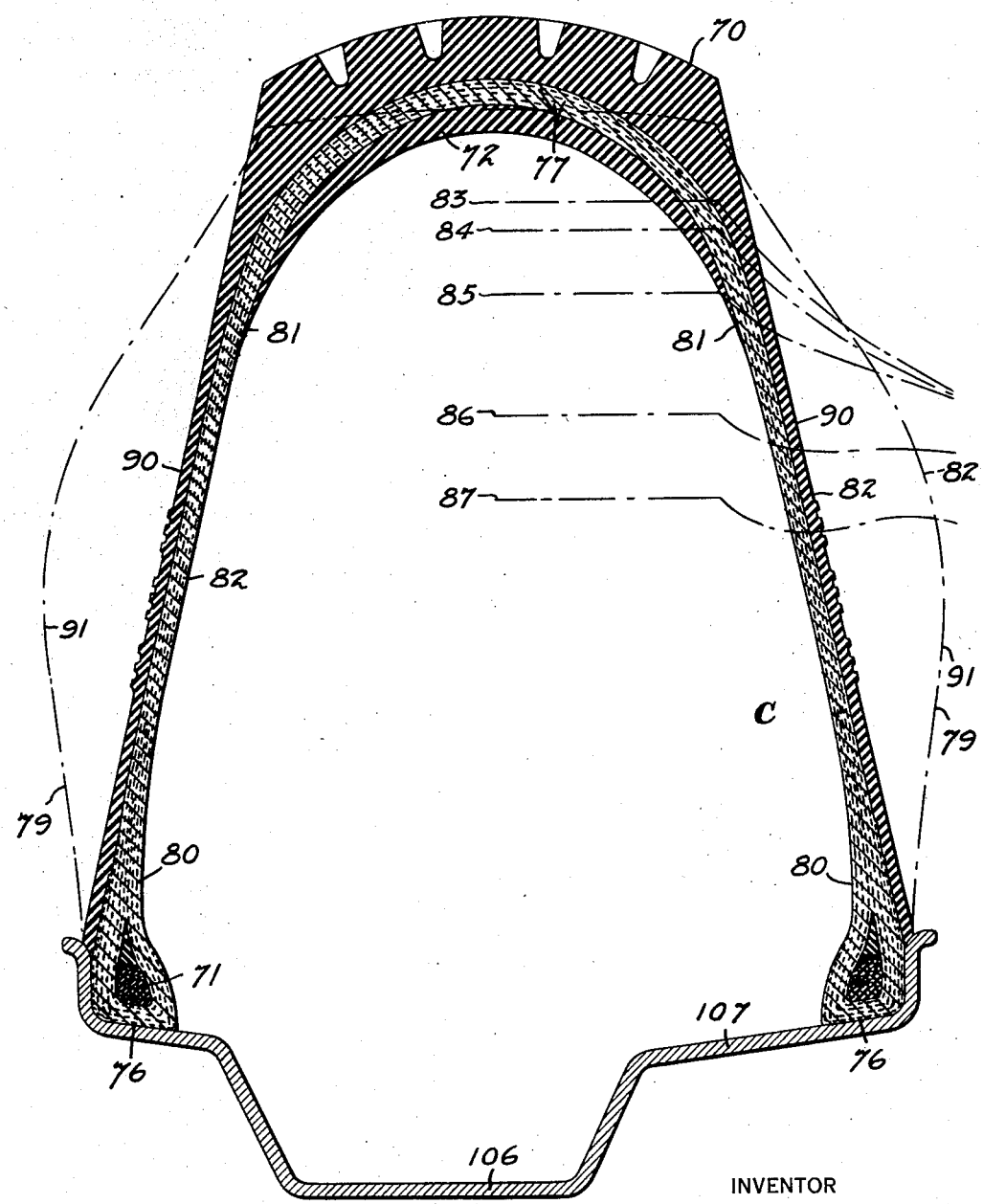
Figure 9:
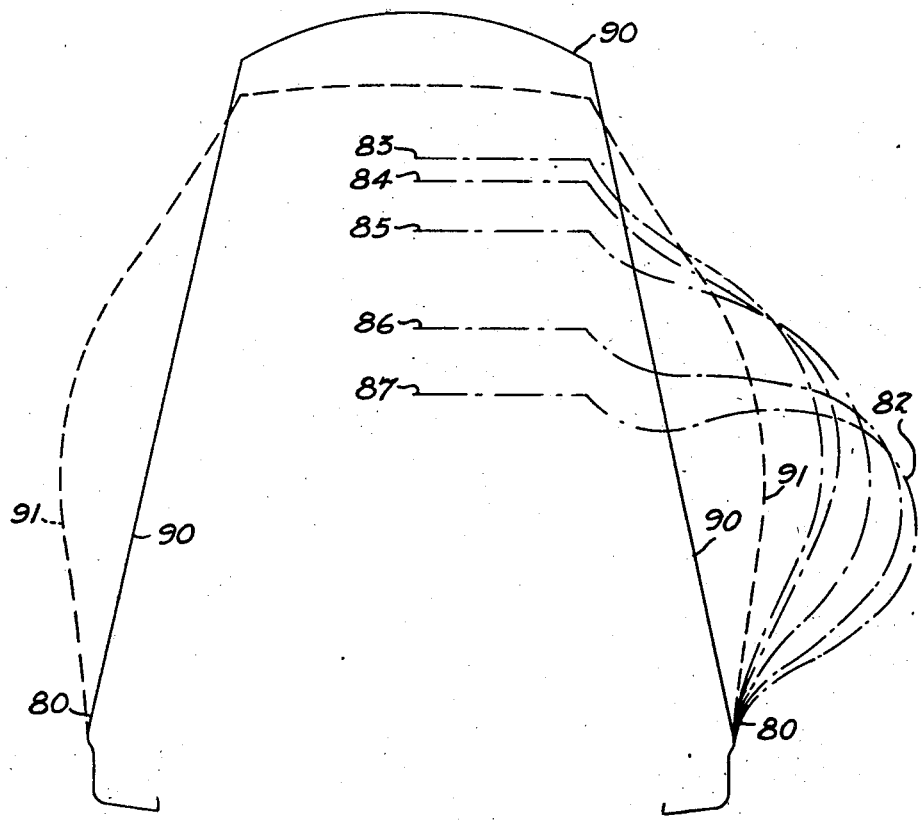
Figure 10:
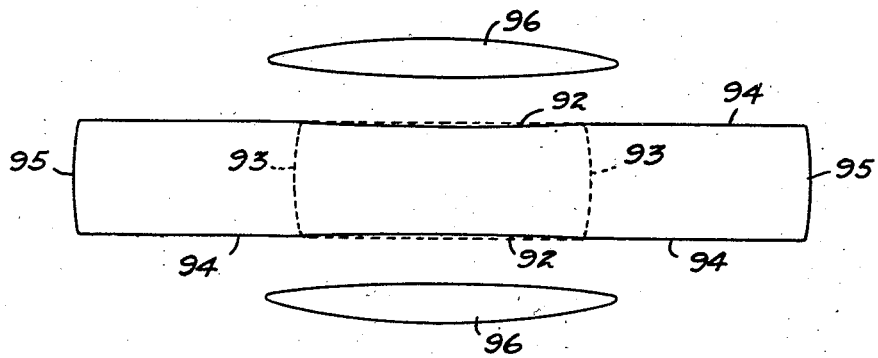
Figure 11:
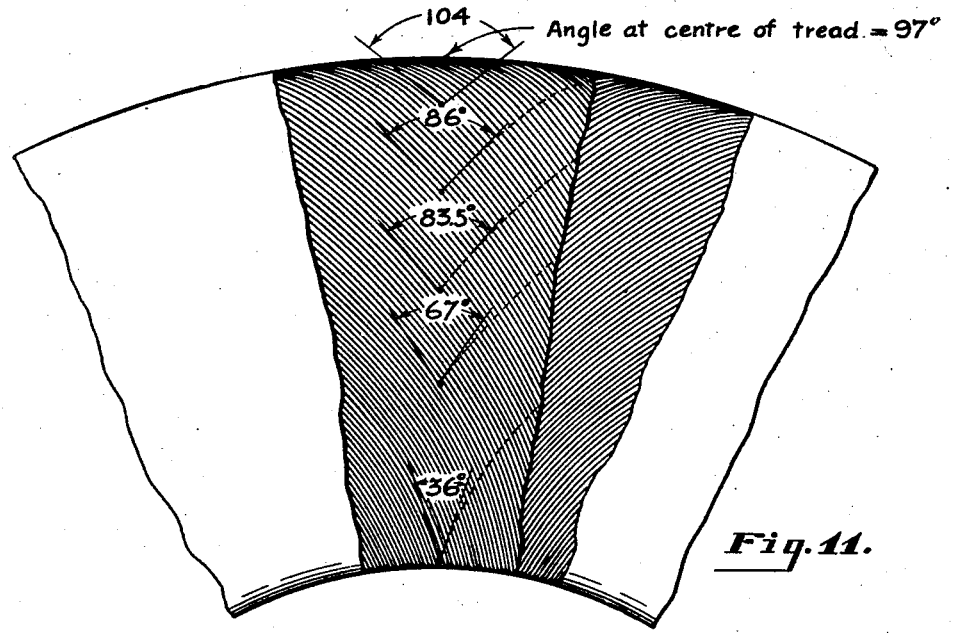
Figure 12:
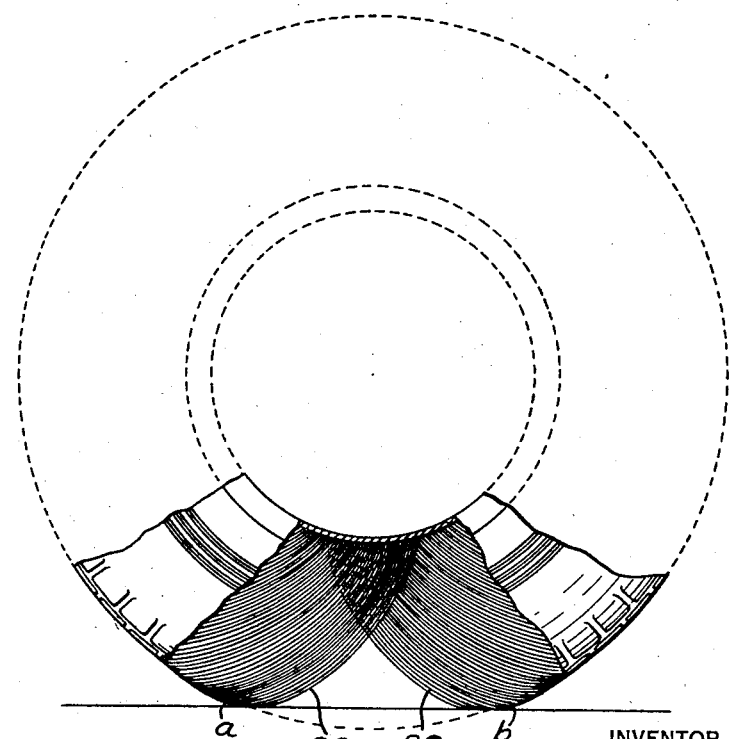
Figure 13:
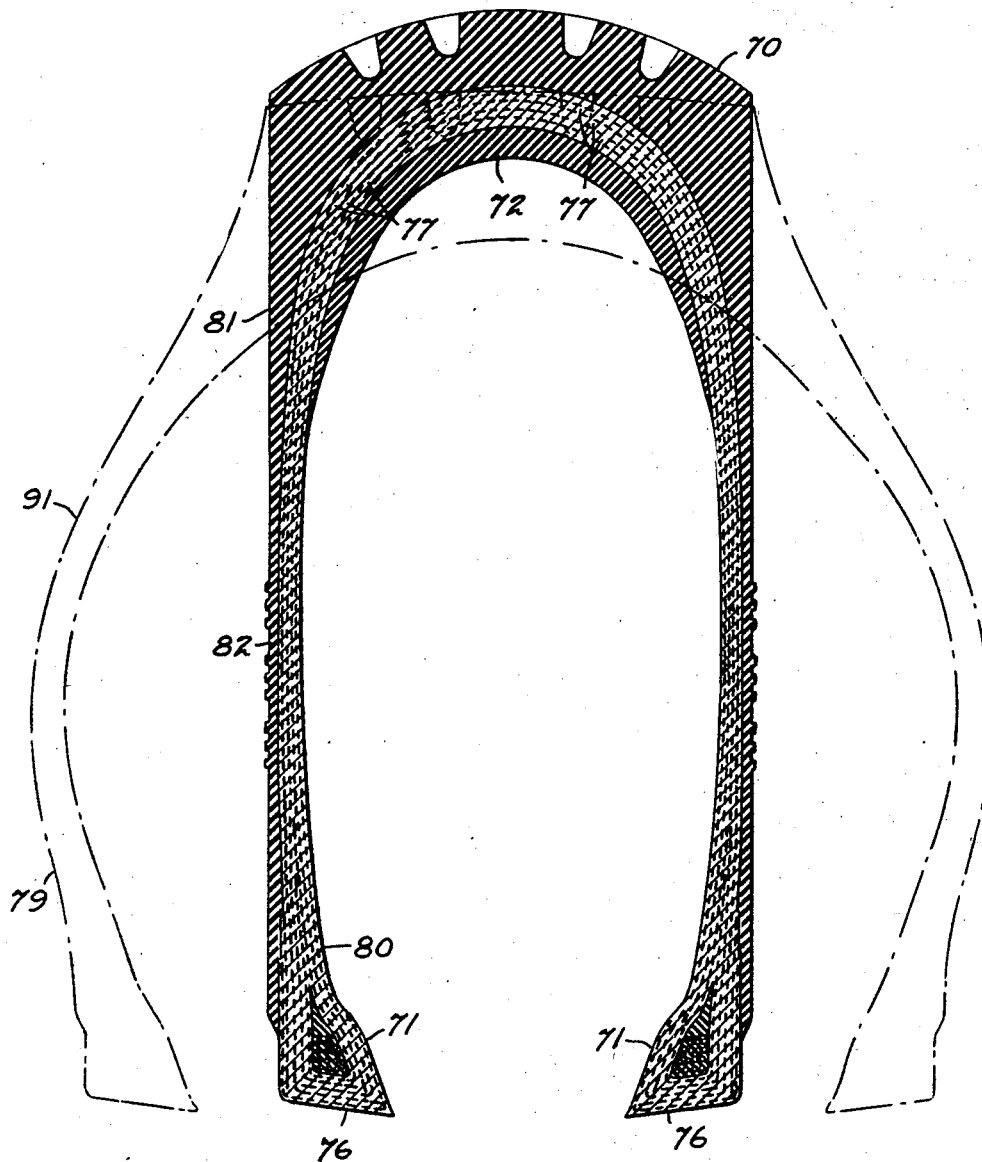

Fig. 3 is a transverse sectional view of a modified form of tire suitable for airplane use showing in full lines the cross-sectional shape of the tire casing as molded, and showing in dotted outline the form of the tire casing when uninflated and mounted on the wheel hub, and further showing in broken lines the inflated outline of the tire casing, the bead diameters of the casing being proportionately the same as the bead diameters of the tire casing shown in Fig. 1;

Fig. 4 is a fragmentary transverse sectional view of the tread portion of a modified form of tire casing suitable for airplane use and illustrating a modified form of transverse stiffening means for the tread portion;

Fig. 5 is a diagrammatic view showing the form of the road contacting area in reduced dimension for tire casings of the general character illustrated in Figs. 1 to 4, inclusive;

Fig. 6 is a transverse sectional view of a tire casing and wheel assembly showing a further modification of the invention;

Fig. 7 is a transverse section through a tire and wheel member suitable for use in connection with motor vehicles and the like;

Fig. 8 is a full size sectional view of the tire casing shown in Fig. 7 illustrating the form in which the tire casing is vulcanized, the inflated shape and the loaded contour;

Fig. 9 is a diagrammatic view in reduced dimension of the contour of the tire casing shown in Fig. 7, uninflated, inflated and under various loads;

Fig. 10 is a diagrammatic view in reduced size showing the road contacting areas of the casing shown in Fig. 7 when under different loads;

Fig. 11 is a fragmentary view showing superposed layers of reinforcing cords and their relative angular position at various portions of the tire carcass;

Fig. 12 is a diagrammatic view showing a tire with the ground engaging portion deflected by a load and illustrating how the arrangement of the cords in the casing resist lateral deflection of the radially inner portions of the side walls;

Fig. 13 shows one form to which an automobile tire may be molded;

Fig. 14 is a full size sectional view of a tire casing that embodies the invention and that is transversely stiffened by the use of cord fabric strips of different widths applied internally of the carcass;

Fig. 15 is a full size sectional view of a further modification of a tire casing embodying the invention;

Fig. 16 is a full size sectional vew of an additional modification of the invention showing the use of cord fabric strips of different widths interposed between the plies of the carcass in the tread zone and also employing an annular rubber arch member for further yieldingly stiffening the tread portion of the tire cascass transversely.

The pneumatic tire of the present invention is adaptable for both aircraft and vehicle use and many of the general characteristics of the aircraft and vehicle tires are substantially the same.

The tire casing of the present invention as compared generally with the conventional balloon tire construction, designed to carry a corresponding load, has a small bead diameter, greater radial depth, an internal transverse tread curvature of small radius when uninflated, a base considerably wider than the conventional tire and a greater air capacity in proportion to its transverse perimeter.

The tire casing of the present invention is vulcanized to a form such that when uninflated and mounted on the rim, the tire has a generally triangular form in cross section tapering from the widely spaced beads or from closely adjacent the beads to a narrower tread the interior of which is transversely curved on a radius which is small as compared to the radius of curvature of the side walls under inflation. On inflation the outward pressure on the side walls draws the tread inwardly reducing its diameter and placing it under circumferential compression. The tire gradually approaches rotundate form as the internal pressure is increased but is held to ovate cross sectional form by the stiff tread. The tire is mounted on a wide rim and its base is wider than the tread. The side walls have portions adjacent the tread and bead which are of gradually increasing stiffness toward the tread and toward the bead, the stiffer portion of the side walls adjacent the bead being disposed in nearly an upright position under inflation so that they resist outward movement of the side walls, permitting only a small amount of outward bulge under inflation and also effectually resisting lateral shifting of the tread with respect to the base of the tire. The tire, therefore, forms a very stable support for the wheel even when the inflation pressure is low so that the wheel is held against lateral movement with respect to the tire tread.

Referring to the accompanying drawings in which like numerals refer to like parts throughout the several views, and in particular to the tire casing construction shown in Fig. 1 of the drawings, which is illustrative of a construction suitable for aircraft use, the carcass of the casing A may be constructed of any desired number of plies of cord fabric 20 arranged with the cords extending diagonally from bead to bead and with the cords of the successive plies crossing each other in the conventional manner. A greater thickness of rubber is interposed between the plies in the zone of the tread 21 than in the side walls 22 of the carcass. This is more clearly shown in the four ply tire illustrated in Fig. 2. Although this tire casing is of somewhat different dimensions from the casing shown in Fig. 1, it is otherwise of the same construction and will be generally referred to in connection with the description of the casing shown in Fig. 1. The casing A is formed with a relatively narrow tread portion 21 and relatively long side walls 22 which diverge from the tread portion 21 toward the tire beads 23. The tread portion 21 of the carcass of the aircraft tire is formed to a thickness at the median zone thereof that is materially greater than the thickness of the side walls 22 by the increased thickness of rubber 24 between the plies or layers of cords 20 and by suitable tread stock applied exteriorly of the cord fabric. The tread portion may also be further thickened by vulcanizing a relatively thick circumferential body of rubber stock 25, such as a more compression-resisting rubber to the interior of the casing at the median zone thereof as particularly shown in Fig. 3. The tread portion 21 may also be thickened and transversely stiffened by employing one or more suitable narrow strips of cord fabric 26, 27 and 28 in the median portion thereof as shown in enlarged section in Fig. 4 or by overlapping the fabric plies in the tread zone. The stiffening strips may have the cords therein extend diagonally or transversely across the tread portion and are preferably of different widths as shown in Fig. 4 of the drawings. These plies also have greater thicknesses of rubber between them than are used in the side walls.

The casing when inflated is of greatest axial width substantially across the beads 23 which are preferably provided with relatively inextensible steel wire re-enforced bead cores 29. The toe and heel portions 30 and 31, respectively, of the bead cores preferably embody pliant, easily compressible stock and the heel portion 31 of each bead is of a generally ogee shape, having an overhanging shoulder 32 formed as a continuation of the side wall stock, which engages the edge of the rim flange 33, resists outward movement of the portion of the side wall immediately above the bead and provides a seal, preventing entry of dirt and moisture to the beads. This overhanging shoulder 32 also serves to streamline the surface of the casing with the hub surface.

Figure 2:
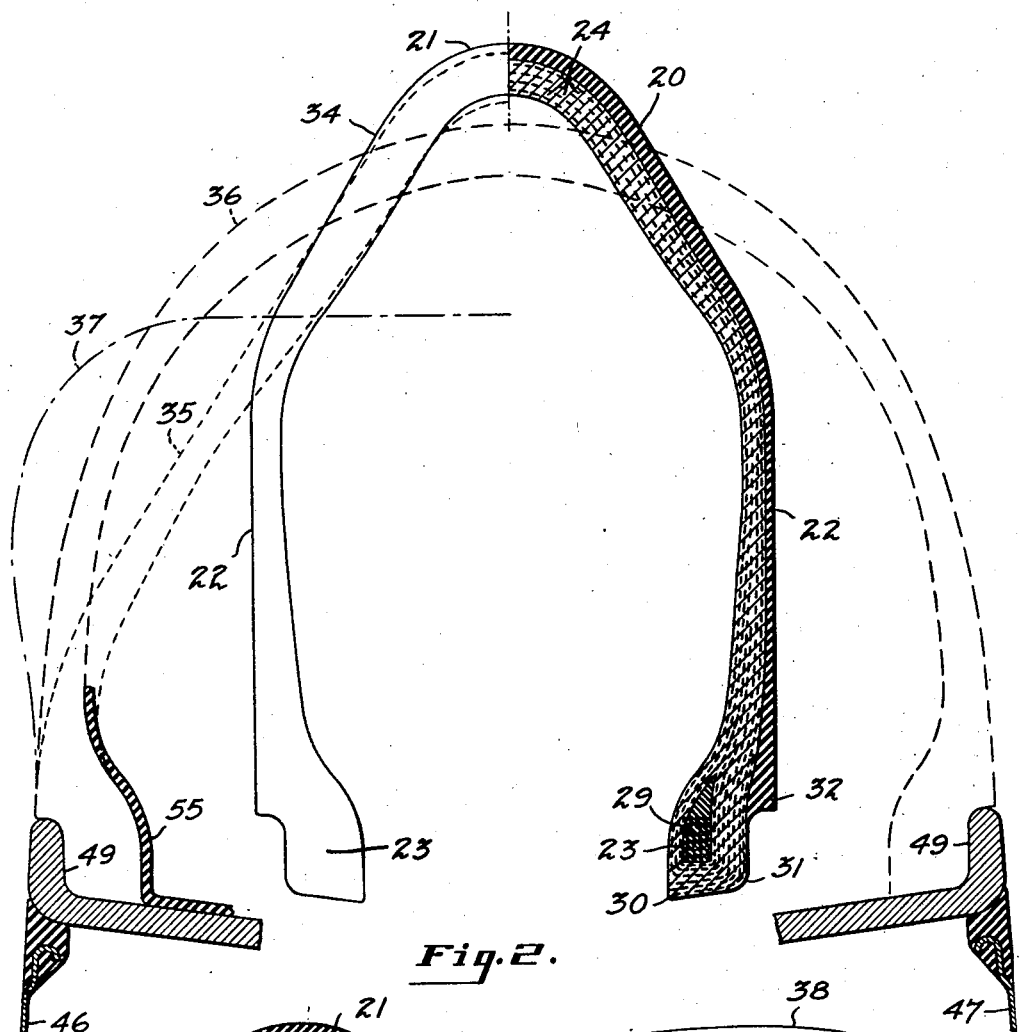
Fig. 2 is a diagrammatic view showing in full lines the transverse cross-sectional shape to which a tire of the character shown in Fig. 1 is molded and in dotted lines the shape when mounted on the hub member, and uninflated, the shape when inflated and the shape assumed by a road contacting portion of the tire under load.

The casing A as previously described, is built up with the side walls 22 diverging toward the beads 23 and is sometimes vulcanized in this shape, although it is preferred to vulcanize the tire casing to the shape shown in the full line 34 of Fig. 2. For each vulcanized shape the tire normally assumes a triangular shape such as that shown in broken outline 35 of Fig. 2 when it is mounted on the hub member B and the internal air pressure is released. The approximate inflated and loaded contours are shown by the dotted contour lines 36 and 37, respectively. The advantage of vulcanizing the casing to the shape 34 shown in full line in Fig. 2 with the beads relatively close together as compared with the mounted position of the beads, is that a substantial tension is imposed on the fabric of the carcass when the tire is mounted on the hub member B and before it is inflated, and that the carcass more strongly resists outward bulging adjacent the beads. The mold units are also of less depth permitting certain economies of manufacture.

The casing A, by reason of its generally triangular shape, materially decreases in diameter in the median tread zone when it is inflated, as indicated by the contour line 36 in Fig. 2. The internal inflation pressure, acting on the flexible side walls, bows them outwardly and causes them to exert a lateral and inward pull on the tread which enlarges the radius of curvature of the tread and draws the tread to a smaller diameter, with the result that the median tread portion is placed under both circumferential and axial compression and the tire casing is held to a radially elongated cross sectional form.

The substantial thickening of the tire casing over the tread portion thereof increases the resistance of the tread portion to circumferential compression and limits the contraction of the tread by inflation pressure, so that the external diameter of the inflated tire casing remains materially greater than it would be if the casing were to assume a shape circular in cross-section, the oversize tread, together with the widely spaced tire beads 23, causes the casing to assume a generally deltoid ovate cross-sectional form upon inflation.

The thickened tread portion, circumferentially compressed by the action of the internal air pressure upon inflation, effectively strengthens the casing and serves as a stiff elastic load supporting member through which a considerable portion of the loads imposed on the casing when in use are transmitted circumferentially to portions of the casing in addition to that portion immediately over the area of engagement with the road bed, expanding portions of the tread on opposite sides of the ground engaging portion and subjecting the side walls to additional tension, whereby a considerable proportion of the imposed loads are carried by the casing structure. The deflection of the casing under load is, therefore, decreased, a greater load may be supported by the casing at a given inflation pressure and a lower inflation pressure is required for a tire of a given load sustaining capability.

The generally deltoid ovate shape of the casing A, as compared with conventional "doughnut" type aircraft tires, provides a stream lining effect which greatly decreases wind resistance. This stream lining, as will be later pointed out, is carried into the wheel assembly.

When an aircraft tire of this type is in operation and supporting its share of the weight of the aircraft, it assumes a shape over the portion in engagement with the ground that is somewhat like that shown in reduced dimension by the contour lines 38 and 39 of Fig. 5. It will be apparent that an elongated oval area of ground contact is provided that enlarges laterally and longitudinally as the load is increased. The relatively narrow central tread portion 21 of the casing transmits a considerable portion of the supported weight circumferentially, and the portions laterally adjacent to the central tread portion also enlarge the ground contact area with increased deflection and thus absorb the landing impact with a minimum of shock and rebound.

The relatively low air pressure and relatively large volumetric air displacement, relatively great radial depth of the tire and the compressed condition of the tread portion serve to increase the range of deflection, materially reduce rebound and increase the load sustaining properties with obvious advantages. In the airplane tire casing shown in Fig. 2 of the drawings, the external radial depth of the tire casing is about 6⅝ inches above the bead base, the radius of the bead base is about 6⅛ inches and the external faces of the beads are separated about 7¼ inches when mounted on the rim.

The tire casing shown in Fig. 3 is of substantially the same proportioned dimensions as the tire casing shown in Figs. 1 and 2. This casing differs from the casing shown in Figs. 1 and 2 by embodying the circumferential rubber arched member 25 that is vulcanized into the nose or tread portion 21 of the casing. The casing is furthermore vulcanized to the general form 40 shown in full line in Fig. 3 with the beads 23 spaced somewhat more closely together than they are when the tire is mounted on the rim that is intended to receive it. The dotted outline 41 of the casing shows its condition when uninflated and mounted on a hub B and the broken line 42 shows its approximate inflated outline.

The circumferential rubber arched member 25 has tapered end portions 43 that extend a substantial distance along the inside of the tire casing, so that the rubber arched member will not tear away from the tire carcass along the edges of the arch when the tire is inflated. This rubber arched member assists in preventing circumferential compression or reduction in dimension of the tread portion 21 of the tire, and it also serves to assist in maintaining more complete contact with the ground of the entire deflected portion of the casing when the casing is under load. An additional function of this rubber arch is to resist separation of the shoulder portions of the tire carcass when the tire is inflated and to distribute the load from the deflected area of the casing to the remainder of the casing structure. It also gives the tire casing a somewhat better streamline form than results in the use of casings without this arched rubber insert.

In previously proposed low pressure tires for aircraft use, the central portion of the ground contacting portion has a tendency to cup upwardly and thereby reduce the effective area of ground contact and to impose greater contact pressures along the edges or shoulders of the contacting area than along the median zone, whereas in the tire of the present invention this tendency is substantially reduced by reason of the stiffness of the tread due to its compression.

It will be apparent that a tire of this contour in addition to offering the advantages of streamlined contour, will offer much less air resistance than previously used tires when folded into an airplane wing or body where retractable landing gear is used.

One suitable type of wheel mounting B for the tire casing A just described is illustrated in Fig. 1. This mounting for the most part is made of light-weight metal stampings so arranged as to provide a very rigid structure.

The small diameter wheel B has a drop center tire rim 45 which facilitates the assembly of the tire on the wheel and which materially enlarges the air space within the tire and improves the cushioning action.

The streamlining effect obtained by the generally parabolic cross-sectional shape of the casing, is further carried out by providing outwardly dished fairing, cover plates or disks 46 and 47, respectively, carried on opposite sides of the wheel and which provide curved surfaces that are continuous with the tire side walls 22. The fairing plates are each sealed by the rubber edge members 48 that merge with the bead flange 49. The brake covering fairing plate 46 has a portion 50 that is carried by the wheel and that seals with the fairing plate portion 51 that is carried by the brake torque plate 52. A suitable cone 53 assists in reducing the wind resistance of the axle 54.

Certain features of the wheel structure herein shown and described are disclosed and claimed in my Patent 1,954,757, granted April 10, 1934, and in my co-pending application Serial No. 592,317, filed February 11, 1932. The streamline tire and wheel assembly for aircraft, herein shown and described, is claimed in my co-pending application Serial No. 686,742, filed August 25, 1933.

Fig. 6 shows an additional modification of a tire casing for airplane use and embodying the invention. The previously described casing structures employed inner tubes 55 for the inflation of the casing, whereas in the construction shown in Fig. 6, no inner tube is required with a resulting saving in weight. The inside face of each of the bead portions 56 of the casing has a layer of soft rubber that is engaged by the bead 57 of the corresponding internal bead retaining flange of the hub. Outside bead rings 58 are clamped against the tire beads by suitable lugs 59. The opposed cone structure of this wheel assembly provides a very strong and light weight wheel and tire assembly. A suitable fairing plate 60 that is held in place by snap springs 61, and a fairing plate 62 that is held in place by a snap ring 63 or other suitable means, serves to streamline the wheel and tire assembly.

The specific tire and wheel assembly shown in Fig. 6 is claimed in my co-pending application Serial No. 426,333, filed February 6, 1930.

The relatively low air pressure used permits sealing the tire casing around the beads in the manner proposed. Any suitable cement may be used to insure an air tight seal. The air sealing bead 57 of the hub may be formed on the outside bead retaining ring 58 if desired, in which event a corresponding layer of soft rubber is formed on the outer face of the tire beads. This is an apparent modification that is not shown.

The tire casings just described are particularly adapted for aircraft use. The same general type of tire, however, is also suitable for motor vehicle use with certain desired modifications. One such tire casing C and a suitable rim and wheel mounting D is shown in Figs. 7 and 8. Since a motor vehicle tire is in continuous contact with the ground and is continuously subjected to road shocks, it is preferred to form the casing shown in Figs. 4 and 5 with tread portion 70 which is considerably heavier and thicker than the tread portion of the aircraft tire previously described, and which is so designed that it becomes substantially flat transversely upon inflation of the casing. Furthermore, the tread portion 70 is made of somewhat greater width than the corresponding portion of the aircraft tire previously described, but it is preferably never of any greater transverse width than the separation of the outer faces of the beads 71. The interior surface of the tire casing C, like that of the aircraft tire casing A, shown in Fig. 3, is also preferably provided with circumferential body of elastic rubber 72 vulcanized thereto, which reinforces the median zone of the casing, offers resistance to the force of the internal air pressure tending to flatten the transverse curvature circumferential compression of the tread, and assists in transmitting a large portion of the load to the casing structure particularly after the casing tread is somewhat worn away.

The body of rubber 72 preferably merges into the inner sides of the side walls 73 at points well beyond the shoulders of the tread portion 70 as shown in Figs. 7 and 8. The body of rubber 72, furthermore, assists in maintaining the transverse stiffness and load sustaining properties of the tread portion even after the tread is considerably worn. The circumferentially compressed tread, together with the generally triangular shape of the tire when mounted on the rim and uninflated, enables the tire to have a shock absorbing action which materially reduces rebound after the casing is deflected by a momentarily imposed load.

The change in the transverse curvature of the tread periphery from the rounded uninflated shape to the substantially flat inflated shape and the compression of the tread rubber, greatly reduces the rapid wear of the tire shoulders caused by shoulder wiping that is characteristic of low pressure tires having transversely rounded tread faces. This property of increased wear is particularly true of tire casings employing the transversely arched annular body of rubber 72 to resist transverse separation of the legs of the arch upon inflation of the tire casing and it applies not only to the tire casings here shown but also to other types of low pressure tires. In low pressure tires having transversely rounded treads, the differences in radius between the tread shoulders and the median zone of the tread in the inflated tire causes the shoulder portions to "squirm" or to be pulled along the ground by the forces set up in the tread rubber over the area of road contact, and this action is believed to produce the rapid shoulder wear heretofore characteristic of such low pressure tires.

The side walls 73 are formed of superposed layers of cord fabric 74 and are relatively long and diverge from the thickened tread portion 70 toward the beads 71 which are provided with relatively inextensible cores 75 of steel bead wire or other suitable material. The tire beads 71 are similar in contour to conventional straight side beads, but the bases 76 thereof are preferably formed to lie in conical surfaces which converge inwardly at substantially the same or slightly greater angularity than the bead seating portion of the rim adjacent the bead retaining flanges, so that, when the beads are forced outwardly against the rim flanges by inflation pressure, the bases of the beads will be seated squarely upon the rim base which preferably has an incline of about seven and one-half degrees. The superposed layers of cord fabric 74 have thicker layers of rubber 77 between them over the tread portion than in the side wall.

It will be noted particularly from Fig. 8 that the tread stock overlying the ply material is of somewhat lesser thickness in the median plane thereof than at the shoulders. The side faces of the tread shoulders are substantially perpendicular to the axis of the tire when the tire is uninflated and the portions of the tread stock forming the shoulders merge into the side wall stock substantially along the same circumferential lines as the side edges of the interior body of rubber 72, thus providing a relatively thick and stiff tread portion which is elastic and compressible but resistant to lateral flexing and circumferential compression.

Suitable annular ribbing or corrugations 78 may be formed on the outer surfaces of the side walls to improve the appearance of the casing and to withstand scuffing of the side walls against curbs and the like.

The tire casing C, like the aircraft casing A, is vulcanized to a form such that the casing when mounted on its rim assumes a generally triangular shape. The shape of the tire casing C when uninflated and mounted on its rim is shown by the full line drawing of Fig. 8. It is to be noted that the tire casing C, when mounted on its rim and uninflated, is of maximum axial width substantially across the beads 71.

Inflation of the casing to the proper pressure causes the side walls 73 to bulge outwardly very slightly beyond the planes of the beads so as to protect the rim flanges against impact against curbs, but the inner portions of the side walls under inflation pressure are disposed at a relatively small angle to the vertical so that the lateral distance between them is nowhere substantially greater than the fixed distance between the exterior side faces of the beads. The internal air pressure acting through the flexible side walls 73 exerts a lateral and inward pull on the tread portion which reduces the transverse curvature of the tread and also reduces the diameter thereof, compressing the tread rubber both axially and circumferentially. The inflated contour of the tire casing is shown in broken lines in Fig. 8. As shown in Figs. 7 and 8, the inner portions of the side walls adjacent the tire beads are disposed nearly in planes perpendicular to the axis of the tire when the tire is inflated. The radial width of the inner side wall portions 79 which diverge outwardly at a small angle depends somewhat on the radial depth of the casing and the inflation pressures for which the tire is designed, but in the particular casing selected for this showing, these portions are between one-third and one-half the radial depth of the casing.

It will be noted that the tire casing when inflated retains its generally triangular shape, the outer faces of the beads being disposed axially outwardly of the edges of the tread portion.

By reason of the resistance of the thickened tread portion to lateral flexing and circumferential compression, and by reason of the diverging side walls and widely spaced beads, the casing is prevented from assuming upon inflation the conventional circular cross-sectional shape toward which it is urged by the internal air pressure.

The stability of the casing C is materially increased by reason of its wide base and the tensioned side walls which converge from near the base to the narrower tread, and lateral thrusts, tending to move a wheel axially with respect to the portion of the tread engaging the ground, are effectually resisted.

As many plies of cord fabric reinforcement as desired may be employed. For purposes of illustration, a four-ply tire is shown in Fig. 5, in which four plies of cord fabric reinforcement 74 are shown extending from bead to bead. The two inner plies extend around the bead ring and have ends which extend outwardly a short distance on the outer side of the outermost ply. One or more conventional flipper strips are also preferably employed which extends outwardly in the side walls of the tire a greater distance than the ends of the plies 74. Suitable chafer strips are also used on the outer and bottom faces of the beads. The flipper strips serve to stiffen the portions of the side walls adjacent the beads, the ends of the reinforcing plies and the ends of the flipper strips are staggered so that there is provided in the side walls a stiffened bead zone 80 which gradually decreases in flexibility toward the beads. The outer portions 81 of the side walls are of gradually increasing thickness and of gradually decreasing flexibility toward the tread. Between the relatively stiff inner and outer portions 80 and 81 of the side walls there is a relatively thin median portion 82 that is reinforced only by the circumferentially continuous plies of cord fabric. The portions 82 of the side walls have the greatest flexibility and provide zones of maximum flexure a considerable distance out from the base of the tire casing. The relatively stiff inner portions 80 of the side walls converge outwardly of the tire base when the tire is uninflated and are shifted to a slight angle past vertical position by internal air pressure.

The broken lines 83 to 87, inclusive, of Figs. 8 and 9 show the approximate outline of the tire casing for loads of 800, 950, 1300, 2000 and 2500 pounds, respectively. These outlines show the capacity of the tire to withstand extremely heavy overloads without acute flexing of the side walls and at an inflation pressure of about 14 pounds per square inch.

The tire of the present invention, when applied to automobiles, has an outside diameter when inflated which is substantially the same as that of the pneumatic tires which are standard equipment for the particular automobile. In view of the greater radial depth of the tires of the present invention, as compared to the conventional balloon tires, they require wheels of smaller diameter. The ratio of the radial depth of the casing to the bead width or the width of the tire base is of importance since the depth of the casing determines the effective range of deflection, and the proportion of the width of the base of the tire to its radial depth is an important factor in the control of lateral deflection of the side walls. The width of the base of the tire casing should be nearly equal to the maximum width of the casing when inflated so that the side walls will be disposed with the major portion thereof tapering toward the tread whereby the tire will provide a stable support for the wheel and effectively resist lateral thrusts tending to move the wheel laterally with respect to the tire tread.

It has been found that the best performance is obtained when the inside radial depth of the casing is made substantially equal to the outside width of its base. The ratio of the radial depth of a tire to the bead radius is determined, to a considerable extent, by the tire and brake drum diameter standards established by automobile manufacturers. With a wheel of a diameter to accommodate standard brake drums, a satisfactory volumetric air capacity and range of deflection are obtained when the radial depth of the tire is substantially equal to the bead radius. It will be understood that variations in the size of automobile wheels might result from variations in the standards above mentioned. The ratio of the depth of the casing to its base width, however, would be maintained while the ratio of radial tire depth to the bead radius might be varied to some extent if brake drum and tread diameters were changed. For a given tread diameter it will be understood that if the depth to width ratio is maintained the tires would be progressively smaller with an increase in the bead radius, since it would be necessary to narrow the base and reduce the depth to maintain the desired angle of stability and the deflection characteristics of the casing. The maximum size of tire, however, is desirable by reason of the greater air capacity and the greater range of deflection. It is highly important that the width of the tread be no greater than the width of the base of the tire in order to provide stability and to limit lateral deflection of the side walls. The tread should have sufficient width to provide ground contact sufficient for efficient traction and proper load carrying capacity. It is now believed that the tread width for a land vehicle tire should be not less than thirty-five percent of the rim width between bead flanges and not more than ninety percent of the rim width for satisfactory performance.

It is necessary that the tread be elastic and sufficiently flexible to readily bend in passing over irregularities on the ground surface over which a vehicle is traveling. In order for the tread to be capable of holding the tire to a radially elongated cross sectional form upon inflation it is necessary that the tread be so proportioned and constructed that the material thereof is sufficiently resistant to compression to effectively resist the inward pull exerted through the side walls by the air at any working inflation pressure.

In the tire as herein illustrated an important factor is the high ratio of radial depth of the tire to its tread radius, since the shrinkage of the tread necessary to permit the tire to assume a shape round in cross section is a function of the transverse perimeter of the tire and increases for tires of a given external diameter as the radial depth of the tire is increased. For example, if the tire of the present invention were made of a radial depth of one-quarter the tread radius, the shrinkage of the tread necessary to permit the tire to assume a shape round in cross section would be only one-half of that required for a tire such as shown, having a radial depth substantially one-half the tread radius. A tread is thus provided which will retain the tire to a radially elongated cross sectional form throughout a wide range of working inflation pressures.

The disposition of the reinforcing cords in a tire casing constructed in accordance with the present invention and having dimensional proportions similar to the tires herein illustrated, contribute materially to the restriction of the lateral expansion of the side walls adjacent the tread and the advantageous deflection characteristics of the casing since they serve to stiffen the inner portions of the side walls. As shown in Fig. 11 of the drawings, angularity of the individual cords with respect to radii increases from the bead to the shoulder portion of the tire, and in view of the fact that the bead circumference is but little more than one-half the circumference of the shoulder portion, the cords are crowded together much closer adjacent the bead and impart a greater stiffness to the bead portions of the side walls, enabling the inner portions of the side walls to more effectively resist lateral deflection due to internal pressure.

As shown in Fig. 12, the portion of the tire engaging the roadbed is flattened somewhat, relieving the tension of the reinforcing cords crossing the flattened portion of the tread so that the side walls on opposite sides of the flattened portion will be deflected laterally by the internal air pressure forming a bulge. The flattening of the compressed rubber tread causes elongation of the tread forwardly and rearwardly of the flattened portion as indicated in exaggerated form at the points a and b in Fig. 12, applying additional tension to cords 88 and 89 which extend from the expanded portions a and b to the portion of the bead in radial alinement with the flattened portion, so that the cords 88 and 89 serve to hold the inner portions of the side walls in their nearly vertical position. The effectiveness of the cords in restraining lateral deflection of the inner portions of the side walls is due largely to the nearly vertical position of these side walls and the relative bead diameter and bead separation since the formation of any substantial outward bulge in the vertically disposed inner portions of the side walls would require an outward thrust sufficient to stretch the cords unduly. Damage to the cord reinforcement upon excessive shocks is avoided by reason of the fact that the tension on the cords 88 and 89 is progressively relieved as the tread deflection is increased. As the tire casing is further deflected by an increased load, the increased tread deflection progressively slackens the cords and the triangular area of lateral flexibility between the oppositely disposed cords 88 and 89 is gradually increased so that the side walls flex sufficiently to allow the inward movement of the tread without subjecting any of the cords to excessive tension. The resistance to lateral bulging provided by the reinforcing cords serves to positively maintain a zone of maximum flexure in the side walls outwardly of the portion of the tire which is of maximum width when the tire is inflated, and protects the inner portons of the side wall against deterioration due to excessive flexing and against bruises and cuts such as are caused by impacts against the rim flanges.

As shown in Fig. 9, the casing C when uninflated has the external contour indicated by the full line 90, and when inflated assumes the contour indicated by the dotted line 91. The casing C under normal load conditions assumes a shape such as that shown in the broken contour line 83 in Fig. 9. The rounded tread portion 70 flattens out and engages throughout its width with the ground. The portions 79 of the side walls adjacent the beads, due to their stiffness are deflected outwardly only to a slight extent and still retain their generally radial position. The intermediate portions 82 of the side walls, due to the outward thrust of the relatively stiff outer portions 81 of the side walls which merge into the tread, bulge laterally to a greater degree. The ground contact area for the tire casing loaded to the extent shown by the contour line 83 of Figs. 8 and 9, is indicated in Fig. 10 by the straight dotted lines 92 which represent the lines of contact of the side edges of the tread and the dotted cross lines 93 at the ends of the contact area.

By reason of the fact that the tread is somewhat narrower than the base and that the relatively stiff inner portions 80 of the side walls resist the outward thrust and remain in nearly upright position, the deflection is largely confined to the flexible portions 82 of the side walls which on excessive load are caused to bulge radially into contact with the ground on opposite sides of the tread. The contact of the tire with the ground under these conditions is indicated in Fig. 10 in which the length of tread contact is indicated by lines 94 and 95 and the side wall contacts by the oval areas 96.

Although the casing as represented by the contour line 87 is loaded several times its normal load, the tread is still maintained a considerable distance from the tire base and the portions 80 of the side walls are still near their upright position so that the bead portions of the side walls are capable of yieldably opposing additional loads tending to collapse the tire casing against its rim. Shocks of impact in excess of those which can be resisted by internal air pressure are thus very effectively cushioned by the tire casing structure and in the event the impact is heavy enough to force the tread against the rim it will be forced into the space between the beads forming therewith a cushioning arch so that a wedging outward thrust will be exerted on the rim flanges and impact directly against the edges of the rim flanges such as occurs with tire casings of conventional design is eliminated. Rim bumps are thus effectively cushioned and bruising and cutting of the casing walls due to the cutting action of tire flanges thereon and to sharp bending of the walls adjacent the beads is eliminated, the casing structure itself effectively absorbing impacts after the air cushion is rendered ineffective by flattening of the tire.

It is to be noted that under normal load conditions the flexing in the side walls is very slight in the tire of the present invention and that tensional stresses in excess of the stresses due to internal air pressure due to the loads imposed on the tire are substantially uniformly distributed throughout a considerable portion of the tire casing so that the individual cords are not subjected to excessive tension.

A novel characteristic of automobile tires described herein is that the contact area between the tread and a smooth supporting surface is substantially rectangular as indicated by the lines 92 and 93 in Fig. 10, whereas in tires of conventional design the contact area is oval in shape tapering forwardly and rearwardly from the axial plane perpendicular to the supporting surface. The road contact of substantially uniform width throughout the length of contact, regardless of the amount of deflection, provides effective traction and load sustaining capability with a tread narrower than required for round cross-section tires. The expansive force of the compressed rubber tread together with the side wall flexure localized in the outer portions of the side walls on opposite sides of the tread contact causes the pressure of the tread on the road surface to be more uniformly distributed throughout the contact area and provides a more advantageous distribution of the stresses due to the distortion of the casing.

The localization of flexure in the outer portions of the side walls which results in re-entrant flexure of these portions of the side walls upon excessive distortion, favors re-entrant deflection of the tread in passing over projecting objects such as curbs, railway rails or other obstructions and the circumferentially compressed tread can be bowed inwardly to a considerable extent without subjecting the reinforcing cords therein to excessive strains since the initial inward bending simply relieves the compression to which the rubber of the tread is subjected by the inflation pressure.

It is obvious that upon increased deflections, due to road shocks, the length of the ground contact area increases. Due to the large air capacity the relatively great distance between the tread portion and base of the tire supporting rim, and the relatively low air pressure, a wide range of cushioning movement is provided and road shocks are effectively absorbed. This is even true under extreme overloading or extreme deflections such as those occasioned by running over high obstructions, for example railway rails, curbs, etc.

A slightly modified construction of tire casing is shown in Fig. 14 in which laterally stiffening strips 97 of cord fabric are employed to impart transverse stiffness to the tread portion to restrict expansion of the shoulder portions of the casing instead of the internal layer of rubber 72 shown in Figs. 7 and 8. The strips 97 are well insulated with rubber and are interposed between the plies 74 of the carcass or are applied internally of the plies 74. The strips 97 are of increasing width inwardly of the tire carcass and have suitable rubber layers 98ª formed over their edge portions to prevent separation.

The tread rubber stock alone may be relied upon to impart the necessary stiffness to the tread portion of the tire but it is not so satisfactory as the use of the internal layer of rubber 72, particularly after portions of the tread have worn away. The rubber insert 72 gives greatly increased wear and better performance from the casing. The tire shown in Fig. 15 of the drawings is constructed without employing either the internal stiffening layer of rubber or the laterally stiffened carcass. The tread 70 in this case is preferably substantially flat transversely when inflated for the purposes hereinbefore set forth.

An additional modification of the tire casing construction is shown in Fig. 16 wherein laterally stiffening strips 97 of cord fabric are well insulated with rubber and are interposed between the plies 74 of the tread portion of the carcass. The internal transversely arched rubber insert 72 is used in connection with the fabric insert for producing a tire casing capable of sustaining greater loads than casings wherein the tread does not have the same high degree of lateral stiffening. The tire casing is shown in Fig. 16 in the cross-sectional form in which it is vulcanized.

Automobile tires such as shown in Figs. 7 to 16, inclusive, may be vulcanized to the shape shown in Fig. 8 but it is preferred to vulcanize the tire in a mold of substantially the same depth as molds used in making balloon tires and this may be satisfactorily done by designing the mold to form the tire to the shape shown in Fig. 13 of the drawings. The tread portion of the tire is preferably molded to the form there shown and the outer faces of the side walls are formed in substantially parallel planes. The spreading apart of the bead portions in mounting the tire casing on the wheel member imparts a substantial tension to the side walls and a shrinkage to the tread. The flexible central portion of the side walls will readily permit the beads to be spread apart axially into engagement with the rim flanges after the tire has been mounted on its rim and the inflation pressure applied. The curing of the bead portions to substantially the base angularity which they naturally assume when mounted on the rim is advantageous in that it relieves the reinforcement in and adjacent to the bead reenforcing wires of stresses tending to twist the beads which would otherwise be set up upon inflation and mounting of the casing.

Tire casings embodying this invention may be made on conventional tire building cores of the proper dimensions or may be built in pulley band form and expanded in accordance with well known practices. Figure 11 shows the approximate angularity of the cord elements in a tire built by the pulley band process. The casing is shown flattened transversely and the angularity of the casing cords at points in the outer portion of the casing are shown at intervals of about one inch from the center of the tread down the side wall of the casing. These angularities have been found very satisfactory for tire casings embodying the invention.

Circumferential and transverse compression of the tread by inflation pressures greatly increases the stiffness of the tread so that a considerable proportion of the imposed load is transmitted circumferentially through the elastic tread, applying increased tension to the cords through a substantial portion of the circumference and supporting a substantial proportion of the load independently of the internal air pressure. The oversize tread holds the tire to an ovate cross sectional form when inflated with the result that the volumetric capacity of the inflated tire is somewhat less than the maximum capacity which would be provided by a tire casing circular in cross section. The initial deflection of the tread under load, therefore, does not decrease the volumetric capacity and, therefore, does not increase the internal air pressure, and there is, therefore, an initial deflection which is imposed upon the elastic tread and through the cord reinforcement to a substantial portion of the tire casing before any load is imposed upon the confined body of air. The spread of the side walls is limited and the tread portion which engages the ground is relatively narrow. The air pressure effective in an upward direction to impart an upward rebound movement of the vehicle after a momentary load increase is much less than in a tire of conventional design with the same amount of deflection, since the outward thrust of the confined body of air is less. The rebound movement is slower for the reason that a large portion of the load is imposed upon the tire casing, the elasticity of which is much less than that of air. This is in addition to the effect of lower inflation pressure which in any tire increases the range of deflection and reduces the rebound.

The compressed tread which is held in a state of balance, by the compression stresses in the rubber acting against the internal air pressure, is highly responsive to centrifugal force due to rotation. Centrifugal force exerts an expansive thrust on the tread which is assisted by the expansive elasticity of the rubber in the tread in opposition to the relatively low internal air pressure. This action enlarges the rolling radius of the wheel at higher speeds. Thus in traveling at high speeds the rolling radius of the wheel is noticeably increased and the deflection of the portion of the tire engaging the ground is decreased. This improves the cushioning action of the tire, makes steering easier and reduces the drag of the tires so that there is no appreciable reduction in the maximum speed or increase in the gas consumption of an automobile equipped with tires embodying the present invention and the rolling radius of the wheel is increased with speed.

An important advantage of the tire casing of the present invention is the ability of the tread portion to conform to irregularities in a road surface and to maintain effective traction in passing over such irregularities. Since the flexing of the side walls under unusual impacts is confined largely to the portions 82 of the side walls outwardly of the stiffened inner portions 80, the tread portion can readily be pressed inwardly beyond portions of the side walls which may engage the ground on opposite sides of an obstruction over which the tread is passing and momentarily take a considerable portion of the load, thereby enabling the tread to readily pass over a sharp obstruction which would seriously bruise a tire of ordinary construction.

For automobiles it is desirable that the tire should have an external base width slightly less than the external radial depth of the casing section. The bead diameter of the tire should be substantially the same as the external radial depth of the casing section in order to provide the deep cushion and shock absorbing qualities desirable for easy riding and to give the tire a stability which makes for easy steering and greater safety in traveling at high speeds over rough roads or around sharp curves.

As an example, one type of tire casing C, suitable for a medium weight vehicle such as a Ford car and which has proven satisfactory, has a base width across the beads of approximately 6⅝ inches, a bead seat diameter of approximately 14 inches, and an outside tread diameter of substantially 29 inches when inflated. This tire may be operated with complete satisfaction at inflation pressures of 14 pounds per square inch.

A conventional tire to support the same vehicle and having the same external diameter when inflated, has relatively closely spaced beads, a width axially of the transverse center of the casing of between 5 inches and 6 inches and a minimum bead diameter of 18 inches, and furthermore would be inflated to pressure varying between 30 and 40 pounds per square inch under normal conditions.

The difference in riding qualities can be readily appreciated since it is well known that road shocks are absorbed more effectively when the tires are inflated to relatively low pressures, such as 10 to 20 pounds per square inch. This is impractical in conventional tire constructions because the range of deflection is not sufficient to avoid rim bumps, and because the deflection characteristics of the conventional tire is not such as to effectively distribute the load and avoid sharp bends in highly tensioned cords. At any such low inflation pressures as proposed, the casing would rapidly deteriorate, the tread would scuff and wear away very rapidly, particularly on the shoulders.

The tire of the present invention may be mounted on a wheel of any suitable construction which, however, should be of small diameter and be provided with a wide rim. In the construction shown in Fig. 7 an inner tube 98 is employed and the casing is mounted on a simple rim and wheel structure comprising a wide drop center rim 99 carried by a disk 100 to which a suitable brake drum 101 may be attached. The disk 100 is of relatively small diameter and the axle hub 102 may be covered by an outwardly dished sheet metal cap 103 having its margin detachably secured within the channel 104 of the rim 99. The valve stem 105 of the inner tube 98 may be mounted in the outer side of the rim channel.

The circumferential well or depression 106 of the rim 99 is preferably relatively narrow, being of a width just sufficient to conveniently receive the tire beads in mounting the tire, and is offset outwardly with respect to the center of the rim so as to provide an inner portion 107 of the rim base which is spaced radially outwardly from the brake drum so as to provide an air space between the drum and rim so that if the brake drum should become heated there will be no danger of sufficient heat being transmitted to the rim to damage the tire casing or inner tube and to facilitate mounting of the casing on the rim.

While it is well known that for tires of a given load capacity the inflation pressure at which a tire should be operated is dependent to some extent upon the volumetric capacity of the tire, and that lower inflation pressures may be employed if the size of the tire is increased, there are certain disadvantages inherent in oversize, low pressure tires of the conventional round cross-section type. One of these disadvantages is that greater force is required to swing the wheels in steering the vehicle and it is essential for satisfactory operation to make alterations in the steering gear to provide greater leverage between the steering wheel and knuckles. Another disadvantage is that the greater tread deflection and larger ground contact area under normal operating conditions imposes a drag on the wheels and more power is required to rotate the traction wheels and propel the vehicle, with the result that the gasoline consumption is increased and the maximum speed of the vehicle is considerably reduced. In addition, the power required to start the vehicle is considerably increased and the vehicle has a slow get-away. Another difficulty experienced with oversize round cross-section tires is that the tendency to rolling and shimmying is greatly increased which adds to the discomfort and diminishes the safety in driving at high speeds over rough roads. Furthermore, low pressure oversized tires of round cross-section, when operated at low inflation pressures, are subject to excessive tread wear, particularly along the shoulders of the casing, scuffing, and lack the durability so highly desirable in automobile tires. The ground contact area of the casing tends to buckle inwardly so that the tread pressures are materially increased around the edges of the road contacting area.

The tire of the present invention has operating characteristics essentially different from tires of round cross-section regardless of size. The tire of the present invention, by reason of its ovate form in cross-section under inflation, its small radius and narrow transversely flattened tread and its side walls diverging from the tread to near the base of the tire, is entirely free from the objectionable features above referred to which are inherent in oversize tires of round cross-section. Tires constructed in accordance with the present invention and operating with the extremely low inflation pressures for which they are designed, steer as easily as the conventional tires operating with from 30 to 40 pounds inflation pressure; they do not decrease the maximum speed of the vehicle; they do not increase the gasoline consumption, and they do not retard the getaway. Furthermore, it has been proven by the records of thousands of tires embodying the present invention that they can be operated at pressures less than half that recommended for conventional tires of the same load carrying capacity without impairing their wearing qualities. The easy steering and easy running qualities of the tire of the present invention are probably due to a considerable extent to the relatively small area of ground contact provided by the narrow normal road-contacting tread and to the balanced stresses under which the tread is held during operation. The stability of the tire is such that the tread has a uniform rolling action and the balanced stresses in the tread serve to maintain a substantially uniform pressure over the area of contact, thereby reducing slippage of the tire on the surface with which it contacts to a minimum and insuring uniformity of wear on the tread surface and lack of bouncing over rough roads.

The internal layer of elastic rubber of small transverse radius within the tread portion of the tire performs an important function in increasing the transverse rigidity of the tread and resisting increase of its radius and curvature and this reinforcement has a further function of maintaining the load carrying capacity of the tire independently of tread wear, the necessary rigidity being retained at the tread portion by the internal layer of rubber even though the treads be worn down to the carcass fabric.

The distribution of stresses due to momentarily applied loads in excess of the load supported by a tire effected by the circumferentially elastic tread coacting with the converging side walls, prevents to a very great extent the exertion of excessive tensile stresses on individual cords or groups of cords so that the tendency to permanently elongate the cords and impair the elasticity of the rubber in which the cords are embedded is greatly decreased and growth of the tires in service due to such elongation is greatly reduced.

Furthermore, it is to be understood that the particular form of tire casing shown and described, and the particular procedure set forth, are presented for purposes of explanation and illustration and that various modifications of said tire casing and procedure can be made without departing from my invention as defined in the appended claims.

What I claim is:

1. A vulcanized rubber casing for pneumatic tires of the large air capacity low pressure type having substantially inextensible beads, a thickened relatively stiff elastic tread portion, flexible side walls between the beads and tread portion, and flexible stretch resisting reinforcement in the side walls and tread portion from bead to bead, the casing being radially deep and having a base materially wider than the tread portion, said casing being vulcanized with the tread oversize by an amount such that, when the tire is mounted on its rim and is uninflated, the side walls of the uninflated tire are substantially straight in axial planes and taper from the base to the tread, the rubber of the tread being compressible but sufficiently resistant to contraction of the tread when it is subjected to the inward pull exerted through the side walls by internal air pressure, to hold the tire to a radially elongated ovate form in cross section upon inflation of the tire to its working pressure, the side walls of the tire casing having median portions of substantial width which are thin and flexible and in which most of the flexure due to loads and shocks of impact occurs.

2. A pneumatic tire casing comprising inextensible bead portions, a tread portion, and side walls connecting the bead portions to the tread portion and having their greatest flexibility in their median portions, the side walls of said casing converging outwardly toward the tread when uninflated and mounted on a wheel member adapted to maintain a fixed distance between said bead portions greater than the width of the tread, said tread being so constructed and proportioned and of such internal transverse curvature that when the tire is inflated the side walls assume a less convergent relation and the material of the tread is compressed both transversely and circumferentially, the material of said tread being sufficiently resistant to such compression by the action of internal air pressure to maintain a radially elongated cross sectional form and to so restrain outward bulging of the side walls that the lateral distance between them is nowhere substantially greater than the fixed distance between the exterior side faces of the beads, throughout a wide range of working inflation pressures.

3. A tire casing as claimed in claim 2 wherein the side walls when unmounted are substantially parallel whereby the spreading of the bead portions in mounting the tire casing on the wheel member imparts a substantial tension to the side walls.

4. A tire casing as claimed in claim 2 wherein the tire tread has a radial thickness adjacent its side edges greater than the median portion and the exterior surfaces of the side walls of the tire when mounted and uninflated are substantially straight from the bead portions to the edges of the ground engaging surface of the tread in axial planes.

5. A tire casing as claimed in claim 2 in which the tread is arched transversely and has its external ground engaging surface curved transversely to a radius greater than its internal surface by an amount such that its external surface is straightened transversely and becomes substantially cylindrical upon inflation of the tire to its working pressure.

6. A pneumatic tire casing for aircraft comprising substantially inextensible bead portions, side walls, and a narrow transversely arched tread, said tire, when uninflated and mounted on a wheel member, being of radially elongated substantially triangular cross sectional form, the side walls being flexible and the material of the tread being compressible, whereby air pressure within the casing causes the side walls to bulge and the tread to shrink, the tread being so constructed and proportioned that its shrinkage is restricted and bulging of the side walls is restrained within limits such that a converging relationship between the outer faces of the side walls from the bead portions to the tread portion is maintained and the tire is held to a radially elongated ovate cross sectional form throughout a wide range of working inflation pressures.

7. A tire casing as claimed in claim 6 in which the tire has a smooth external surface which, when the tire is mounted on a wheel member and inflated, has its maximum curvature centrally of the tread, the external faces of the tire casing gradually decreasing in curvature from the tread to the bead portions throughout a wide range of working inflation pressures.

ALGER G. MARANVILLE.